No. 861,594. PATENTED JULY 30, 1907.
D. VON DER LIETH.
APPARATUS FOR PRESERVING FRUITS, &c.
APPLICATION FILED APR. 27, 1907.
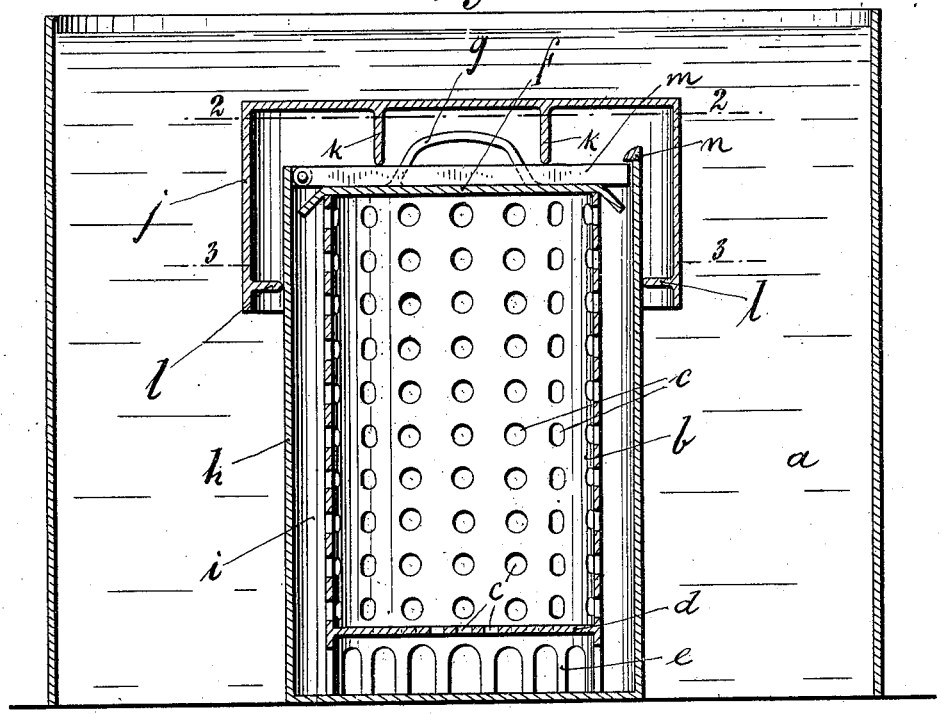
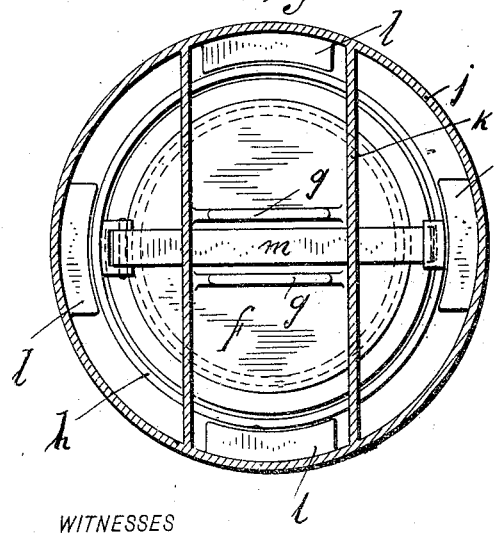 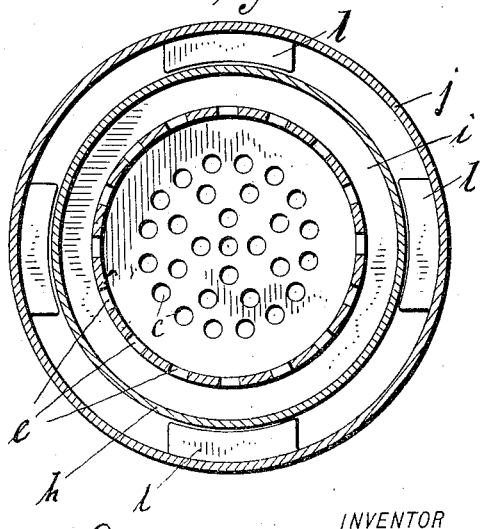
WITNESSES
Geo Schwarz
Johanne Drumberger
INVENTOR
Diedrich von der Lieth
BY
Max H. Ordmann
ATTORNEY

UNITED STATES PATENT OFFICE.

DIEDERICH VON DER LIETH, OF NEW YORK, N. Y.

APPARATUS FOR PRESERVING FRUITS, &c.

No. 861,594.  Specification of Letters Patent.  Patented July 30, 1907.

Application filed April 27, 1907. Serial No. 370,650.

*To all whom it may concern:*

Be it known that I, DIEDERICH VON DER LIETH, a citizen of the United States, and a resident of New York, county and State of New York, have invented certain new and useful Improvements in Apparatus for Preserving Fruits, etc., of which the following is a specification.

The present invention pertains to an apparatus for preserving fruits, vegetables, flowers, etc., and consists in the construction of a receptacle for such goods adapted to be entirely submerged in water, so that the air contained in said receptacle is cut off from the atmosphere and is constantly cooled by the surrounding water, whereby the flowers and other goods can be kept fresh for a considerable time.

My invention is illustrated in the accompanying drawing in which similar reference letters denote corresponding parts, and in which Figure 1 is a vertical section of my apparatus, Fig. 2 a cross section through line 2—2 of Fig. 1, and Fig. 3 a cross section through line 3—3 of Fig. 1.

With reference to the drawing, *a* denotes a pool or basin filled with water in which my apparatus is submerged. The apparatus proper consists of a receptacle *b* of any suitable shape and material, and provided with perforations *c* in its walls and bottom *d*. Below the bottom, the receptacle is provided with a perforated rim or with feet *e*, so that the bottom of the receptacle will be somewhat raised from the base on which it rests, in order to allow of the circulation of air therethrough. The receptacle has a removable cover *f* provided with handles *g*. This receptacle *b* is adapted to fit in a wider receptacle *h*, in which a narrow annular air space *i* is formed between its walls and those of the inner perforated receptacle *d*. The top of said receptacle *h* is open and surrounded by a cap *j* of a larger diameter than that of the receptacle *h*. This cap is supported on top of the cover *f* by cross ribs *k*, *k* leaving a free space between it and the cover *f* and by means of lateral inwardly projecting ribs *l* abutting against the walls of the receptacle *h* whereby it is held in central position.

The goods to be preserved are placed into the perforated inner receptacle and after the parts are assembled, the apparatus is submerged, the outer receptacle resting on the bottom of the pool or basin. The air contained in the narrow space between the inner and outer receptacle will prevent the surrounding water from rushing into the receptacle *h*, and will cool the air contained in the narrow space thereof, owing to which circumstances, the goods in the perforated receptacle will be kept alive or fresh for a considerable length of time.

The cover *f* on top of the perforated receptacle may after the insertion of the goods and after placing the said receptacle into the receptacle *h* be secured in position by a locking bar *m* hinged to the latter and engaging spring catches *n* or the like.

The apparatus may be modified in various ways and I therefore do not restrict myself to the particular arrangement shown, but

What I claim and desire to secure by Letters Patent is:

An apparatus for preserving fruits, flowers, etc., under water, comprising an outer open topped receptacle, a similar inner receptacle to contain the goods, having perforations in its side walls and bottom, and standing raised from the bottom of the outer receptacle to form a free space permitting the circulation of air, a removable cover for said inner receptacle, locking bars hinged to the outer receptacle and adapted to hold down said cover, and a cap of a larger diameter than the outer receptacle and forming a free space around and above the outer receptacle, substantially as and for the purpose specified.

Signed at New York this 25 day of April 1907.

DIEDERICH VON DER LIETH.

Witnesses:
MAX D. ORDMANN,
ROBERT STRAHL.